United States Patent
Broyles et al.

(10) Patent No.: US 8,516,481 B2
(45) Date of Patent: Aug. 20, 2013

(54) VIRTUAL MACHINE MANAGER SYSTEM AND METHODS

(75) Inventors: Paul Broyles, Houston, TX (US); Dalvis Desselle, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 294 days.

(21) Appl. No.: 12/936,155

(22) PCT Filed: Apr. 4, 2008

(86) PCT No.: PCT/US2008/059391
§ 371 (c)(1),
(2), (4) Date: Oct. 1, 2010

(87) PCT Pub. No.: WO2009/123640
PCT Pub. Date: Oct. 8, 2009

(65) Prior Publication Data
US 2011/0029974 A1 Feb. 3, 2011

(51) Int. Cl.
*G06F 9/455* (2006.01)
*H04L 29/06* (2006.01)

(52) U.S. Cl.
USPC .............................................. 718/1; 713/155

(58) Field of Classification Search
USPC ............................................................ 718/1
See application file for complete search history.

(56) References Cited

U.S. PATENT DOCUMENTS

| | | | |
|---|---|---|---|
| 6,950,824 B1 | 9/2005 | Babiskin et al. | |
| 2005/0251867 A1* | 11/2005 | Sastry et al. | 726/34 |
| 2006/0184937 A1* | 8/2006 | Abels et al. | 718/1 |
| 2006/0218544 A1* | 9/2006 | Chakraborty et al. | 717/168 |
| 2007/0204266 A1* | 8/2007 | Beaty et al. | 718/1 |
| 2007/0250833 A1* | 10/2007 | Araujo et al. | 718/1 |
| 2008/0008141 A1* | 1/2008 | Tchigevsky et al. | 370/338 |
| 2008/0126779 A1* | 5/2008 | Smith | 713/2 |
| 2008/0163209 A1* | 7/2008 | Rozas et al. | 718/1 |
| 2008/0235754 A1* | 9/2008 | Wiseman et al. | 726/1 |
| 2009/0119664 A1* | 5/2009 | Pike et al. | 718/1 |
| 2009/0169017 A1* | 7/2009 | Smith et al. | 380/278 |
| 2009/0220090 A1* | 9/2009 | Savagaonkar et al. | 380/277 |
| 2010/0023739 A1* | 1/2010 | Levit-Gurevich et al. | 713/2 |

\* cited by examiner

*Primary Examiner* — Emerson Puente
*Assistant Examiner* — Charles Swift

(57) ABSTRACT

Embodiments of the disclosure describe system and methods for virtualized system. In this regard, the virtualized system comprises a virtual machine manager (VMM), the virtual machine manager comprising policy settings that are directly configurable by an administrator, wherein the policy settings are measured as part of a measured launch of the virtual machine manager; and at least one virtual machine that is managed by the virtual machine manager.

19 Claims, 3 Drawing Sheets

VIRTUAL MACHINE MANAGER SYSTEM AND METHODS

BACKGROUND

1. Technical Field

This disclosure generally relates to virtual machine management and configuration.

2. Description of the Related Art

Virtual machines were initially developed to solve the problem of time-sharing expensive mainframe hardware. A virtual machine (VM) is a fully protected and isolated copy of an underlying physical machine's hardware; a single physical machine may run a plurality of VMs. Each VM user is given the illusion of having a dedicated physical machine. Software developers may write and test programs in a VM without fear of crashing the physical machine and affecting other users. The VM users may run their VM instances on separate physical machines that are connected via a network to the physical machine running the virtualized system, allowing the users to access the applications, files, and hardware of the physical machine from a remote machine.

Between the VMs and the physical machine lies the virtual machine manager (VMM), or hypervisor. The VMM is a software layer that controls the VMs' access to the underlying physical machine so that the VMs do not interfere with each other or the physical machine. The VMs execute without interference from the VMM, albeit in a non-privileged mode, which allows the VMs to execute directly on the hardware of the physical machine; this increases efficiency of the virtualized system. However, the VMM will intervene whenever a VM tries to perform any operation that may affect the operation of other VMs or the underlying physical machine. The VMM safely emulates the possibly risky operation, then returns control back to the VM. VMs therefore may achieve close to native performance without compromising the integrity of the underlying physical machine.

Security is an important concern in virtualization; each link in the chain from the physical machine to the VMM to the VM must establish a degree of trust. One method of establishing trust is a measured launch of the VMM. A measured launch procedure may evaluate all or part of the software that comprises the VMM, and then store the results of the evaluation in a secure hardware location. As the VMM runs, the stored results of the measurement, also known as attestation data, may be used to verify the state of the VMM, and determine if the VMM software has been changed without authorization or corrupted by, for example, a virus.

SUMMARY

Embodiments of virtual machine manager (VMM) systems and method are provided. In this regard, an embodiment of a system, among others, comprises: a virtual machine manager, the virtual machine manager comprising policy settings that are directly configurable by an administrator, wherein the policy settings are measured as part of a measured launch of the virtual machine manager; and at least one virtual machine that is managed by the virtual machine manager.

An embodiment of a method, among others, comprises: inserting policy settings into a virtual machine manager, the policy settings provided by an administrator; measuring at least a portion of the virtual machine manager, the measured portion including the policy settings; and storing a result of the measurement.

An embodiment of a computer readable medium comprising a program for measurement of a virtual machine manager, among others, comprises: preparing a portion of a virtual machine manager to be measured, the portion comprising policy settings configured by an administrator; measuring the prepared portion of the virtual machine manager; and storing a result of the measurement.

Other systems, methods, features, and/or advantages of this disclosure will be or may become apparent to one with skill in the art upon examination of the following drawings and detailed description. It is intended that all such additional system, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

This disclosure describes a general framework for allowing an IT administrator to configure policies for a Virtual Machine Manager (VMM); several exemplary embodiments will be discussed in detail. An administrator of a VMM may, for example, want to disallow or limit the access that a VM has to the hardware or software of the remote machine on which a user executes the VM. Rules such as the definitions of the relationship between a VM and a remote machine are called policies, or policy settings. Embodiments of the disclosure allow for measurement of the policy settings of a VMM as defined by an IT administrator as part of a measured launch of the VMM, so that a user may know if the or its policy settings have been changed without authorization or corrupted.

A VMM according to embodiments of the disclosure contains an area reserved inside the VMM for policies to be stored. A VMM installation or configuration utility may provide a user interface (UI) to enable an administrator to set the desired policy settings directly into the VMM. Policy setting may occur during installation to the disk or offline; the utility may manipulate the VMM image itself. Any appropriate method of embedding the policy settings into the VMM may be used. Since the policy settings are part of a VMM, the policy settings may be measured along with the rest of the VMM for security purposes. VMM policy settings are therefore flexible and configurable, and IT administrators may secure the VMM policies alongside the VMM.

Figure 1:
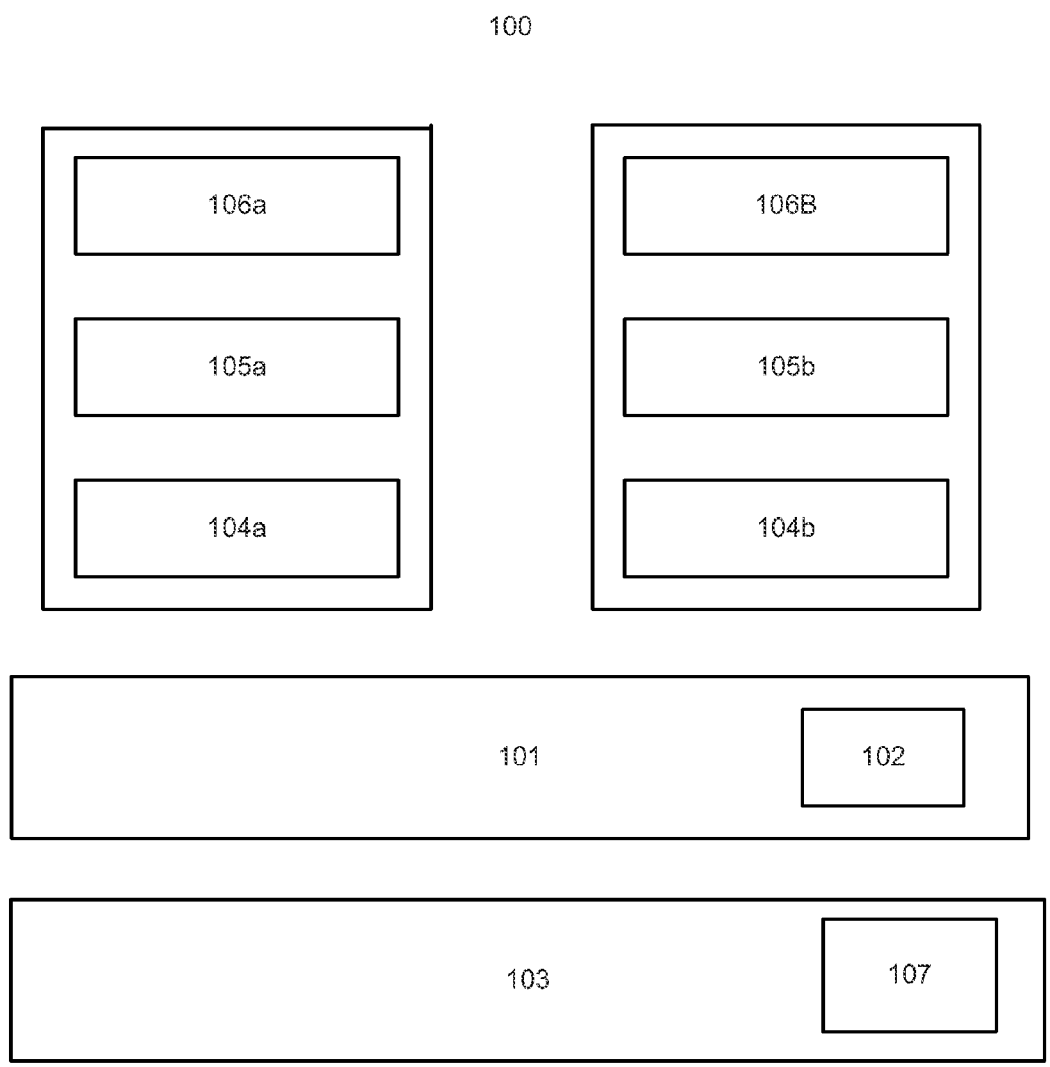
FIG. 1 shows a block diagram an embodiment of a virtualized system.

FIG. 1 shows an embodiment of a virtualized system 100. Physical machine 103 comprises computer hardware, such as a personal computer or a server, or any other appropriate type of computer. Physical machine 103 executes an operating system (OS); the OS may be any appropriate operating system, such as, for example, Microsoft Windows, Unix, or Linux. The VMM 101 runs on physical machine 103 to coordinate execution of VMs 104a and 104b. While two VMs are shown in FIG. 1, any appropriate number of VMs may be supported by a single VMM. VMM acts as an arbitrator between the multiple VM sessions, and allocates system resources of physical machine 103 to each VM session, including one or more of memory, address space, input/output bandwidth, and processor runtime. VMM 101 resides on physical machine 103. Each VM 104*a-b* runs an operating system 105*a-b*; each VM may run a different operating system, as desired by the administrator. Operating systems 105*a-b* support applications 106*a-b*; these applications may be any appropriate application software for remote use by the user, a non-limiting example being Microsoft Office. Storage location 107 is a hardware location in physical machine 103 that securely stores attestation data that is produced by the measured launch; storage location 107 may comprise a Trusted Platform Module (TPM), or any other appropriate storage. TPMs are discussed in further detail below. Policy settings 102 are set directly into VMM 101 by an IT administrator, so that the policies may be evaluated by the measured launch process along with the rest of the VMM, enabling detection of any unauthorized changes to the policy settings 102.

A Trusted Platform Module (TPM) is a physical chip that stores security information; the TPM specification, e.g. TPM 1.1 and 1.2, is a project of the Trusted Computing Group (TCG), https://www.trustedcomputinggroup.org/. A TPM is a hardware device that allows sealed storage of attestation data. The measurement process may summarize the hardware and/or software of a system to create a nearly unforgeable hash key summary; this key may be used as attestation data for trusted interactions with remote machines. The attestation data allows a third party, such as a remote machine running a VM that is tied to a VMM, to verify that the software of the VMM has not been changed or corrupted during execution.

Under the TPM 1.1 specification, a standard PC platform is equipped with a TPM chip. The TPM chip serves as a hardware key storage, storing measurements of the platform, such as hashes of portions of the software. The measurement tool may decide which portions of the system to measure, as the total amount of software in the virtualized system may be quite large. The stored measurements are used to produce signed statements about the software chain. The TPM 1.2 specification makes it possible to launch and measure a trusted subenvironment from within an untrusted environment. TPM 1.2 also accommodates measurement of larger portions of software. Intel's TPM-based security framework was formerly called LaGrande Technology, and is currently known as Trusted Execution Technology, or TXT (http://www.intel.com/technology/security/). Many of Intel's Core 2 Duo CPU's support TXT. However, chipset support is required for TXT to be operational. AMD also supports TPM 1.1 and 1.2 in some of its chipsets, using its Secure Execution Mode technology (SEM). Microsoft's framework for TPM 1.2 is called Next Generation Secure Computing Base, or NGSCB (formerly known as Palladium); NGSCB is a framework for using a TPM 1.2 chip, CPU, chipset and software to provide an environment in which trusted applications may be developed and launched from within the Windows operating system. Intel's TXT and AMD's SEM are hardware-based solutions, whereas the NGSCB framework is software-based. However, NGSCB was not included in Windows Vista. Instead, Vista makes use of a subset of the functions of the TPM chip, but not TXT or SEM. The descriptions of the foregoing technologies are included for illustrative purposes; embodiments of the disclosure may be used with any of the above technologies, or any other appropriate technologies for measurement and attestation of a virtualized system.

Figure 2:
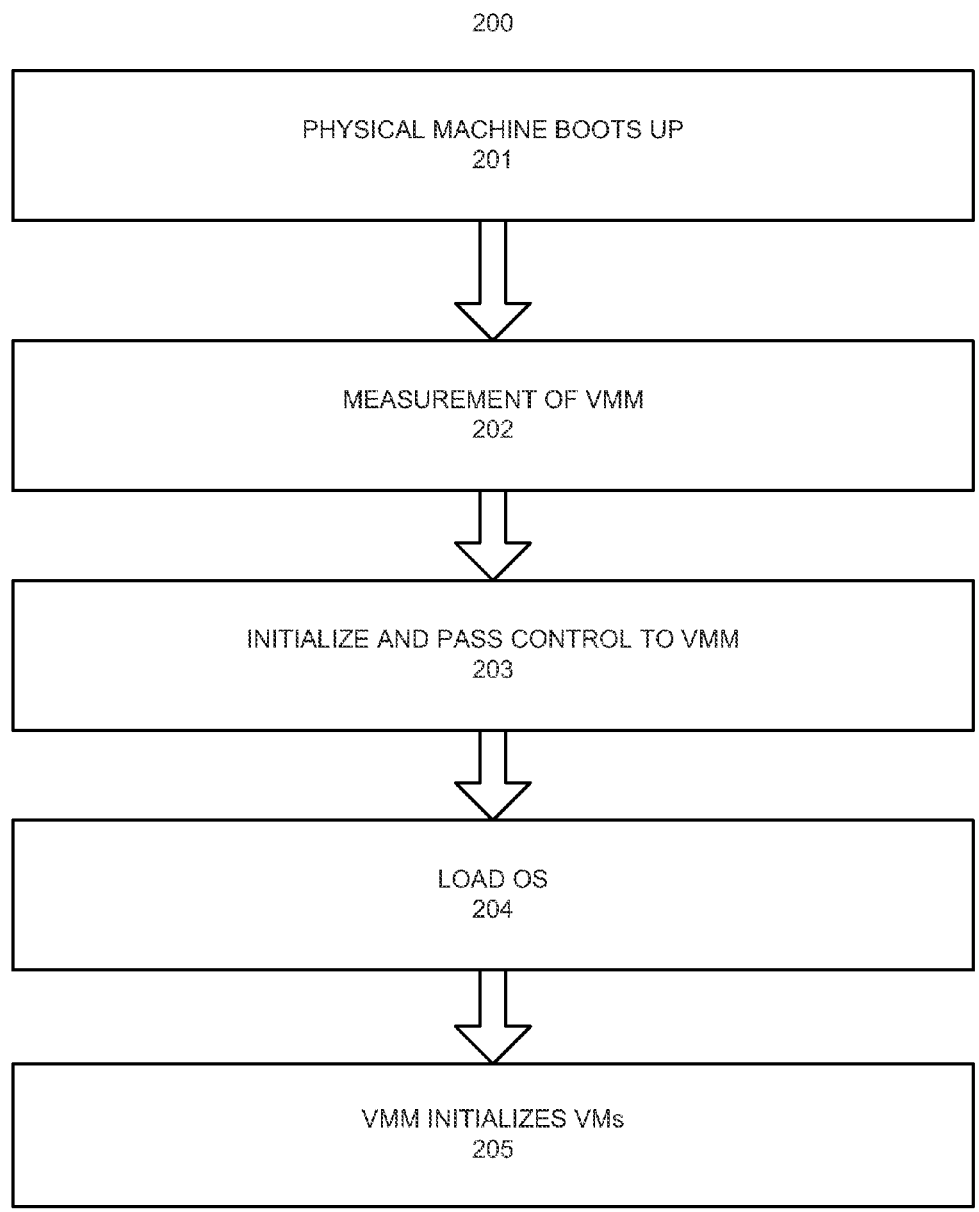
FIG. 2 shows a flowchart of an embodiment of a launch of a virtualized system.

FIG. 2 shows a flowchart of an embodiment of a launch process 200 of a virtualized system, such as system 100, using a measured launch. In block 201, physical machine 103 boots up. The physical machine 103 then begins the measurement process of the VMM in block 202 to check the integrity of the VMM 101. After the measurement process is completed and the integrity of the VMM is verified, the physical machine 103 initializes and passes control to the VMM in block 203. Measurement occurs before the VMM 101 is booted to ensure that the physical machine 103 does not pass control to a corrupted VMM. The Operating System (OS) that runs on the physical machine 103 is then loaded in block 204. The OS may be based on, for example, Linux, Windows, Unix, or any other appropriate operating system. The OS may be based on, for example, Linux, Windows, Unix, or any other appropriate operating system. Once the measurement process is complete and the OS is loaded, the VMM 101 initializes and starts execution of VMs 104 in block 205. In other embodiments of a launch, the OS running on physical machine 103 may load before the VMM 101 is measured and initialized.

Figure 3:
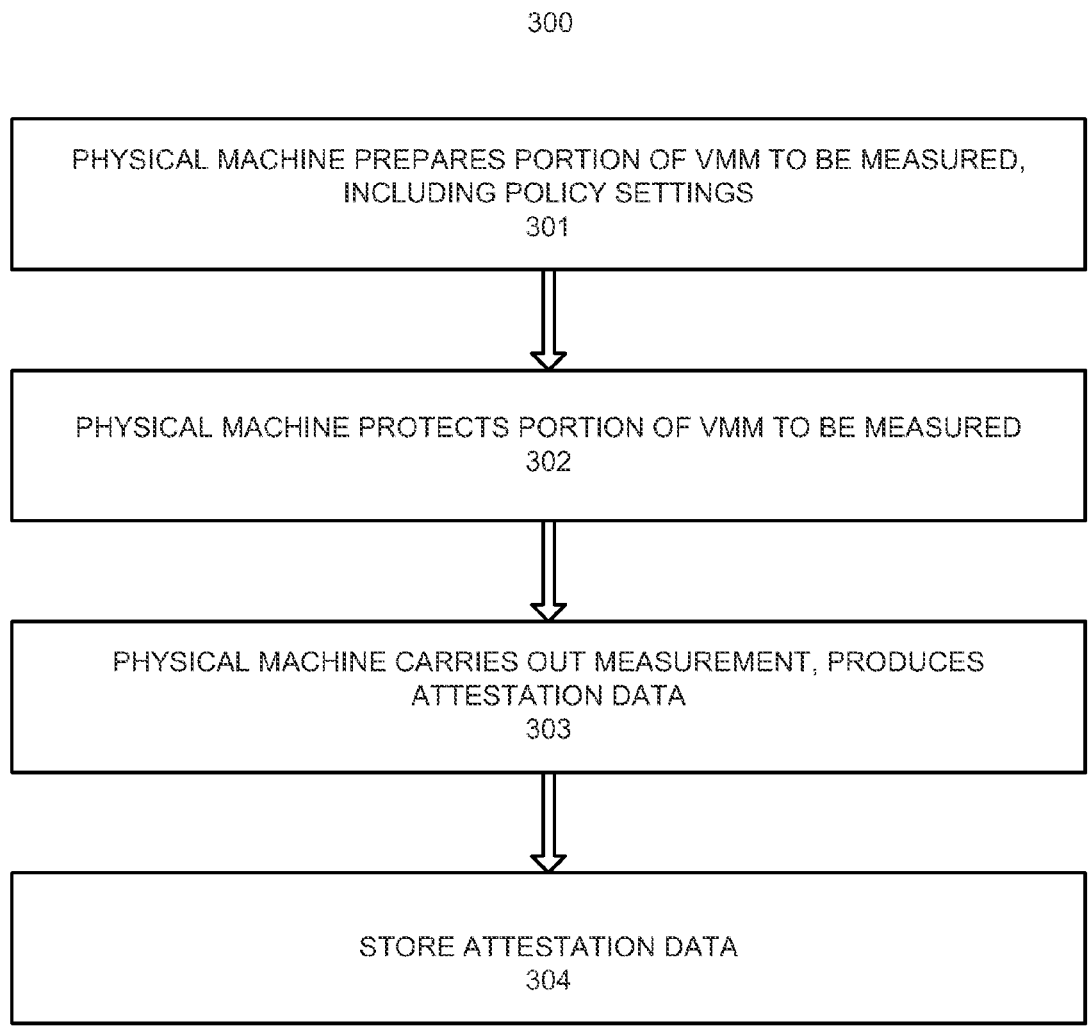
FIG. 3 shows a flowchart of an embodiment of a VMM measurement method.

An embodiment of the measurement process 300 from block 202 is shown in more detail in FIG. 3. In block 301, the physical machine 103 prepares the portion of the VMM 101 that is to be measured. The portion of the VMM 101 that is measured includes policy settings 102. Some or all of the VMM 101 may be measured. The physical machine 103 protects the portion of the VMM 101 being measured from direct memory access in block 302, to prevent corruption of the VMM 101 during the measurement process. The physical machine 103 then measures the designated portion of the software of the VMM 101 in block 303. The measurement process produces attestation data that attests to the state of the VMM 101; this could be, for example, a hash of the software that has been measured. In block 304, the attestation data is stored in a secured storage location 107 in the hardware of the physical machine, which in some embodiments may be a Trusted Platform Module.

Any appropriate method may be used to set the policy settings 102 into the VMM 101 by the administrator. Some embodiments may use a remote management system such as DASH (Desktop and mobile Architecture for System Hardware, http://www.dmtf.org/standards/mgmt/dash/), which is a project of the Distributed Management Taskforce, Inc. (DMTF); any other appropriate proprietary or non-proprietary software application may be used to set the policy settings 102 into the VMM 101.

There are many VMM policies 102 that an administrator may wish to set in the VMM 101 and have measured. Some of the policies 102 may relate to hardware device control on the remote machine, such as virtually disabling USB ports, floppy drives, or CD-ROMs to prevent unauthorized copying of data, not allow any add-in Network Interface Cards (NICs), or even the primary NIC in some controlled configurations. The policy settings 102 may also disallow boot of the VMM 101 if a certain measurement of the VMM 101 changes; this is a boot policy type of control. The policy settings 102 may not allow the VMM 101 to launch if the BIOS version is not as specified; this is also boot policy type control, but brings in components outside the VMM 101 into the policy. The antivirus definition file could be part of the policy settings 102. The above are non-limiting examples of policy settings that may be set in the VMM according to embodiments of the disclosure.

The foregoing disclosure of embodiments of the present disclosure has is been presented for purposes of illustration and description. It is not intended to be exhaustive or to limit the disclosure to the precise forms disclosed. Many variations and modifications of the embodiments described herein will be evident to one of ordinary skill in the art in light of the above disclosure. Note that the aforementioned examples are not meant to be limiting. Additional embodiments of systems and methods are also contemplated that may include many of the above-described features. Other systems, methods, features, and advantages of this disclosure will be or become apparent to one with skill in the art upon examination of the following drawings and detailed description. It is intended that all such additional systems, methods, features, and advantages be included within this description and be within the scope of the present disclosure.

Embodiments of the present disclosure can be implemented in hardware, software, firmware, or a combination thereof. In various embodiment(s), system components are implemented in software or firmware that is stored in a memory and that is executed by a suitable instruction execution system. If implemented in hardware, as in some embodiments, system components can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Software components may comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In addition, the scope of the present disclosure includes embodying the functionality of one or more embodiments in logic embodied in hardware or software-configured mediums.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from the shown or discussed, including substantially concurrently or in reverse order, depending on the functionality involved, as would be understood by those reasonably skilled in the art of the present disclosure.

What is claimed is:

1. A virtualized system comprising:
   a processor;
   a virtual machine manager to manage, when executed by the processor, at least one virtual machine; and
   at least one virtual machine that is managed by the virtual machine manager;
   wherein the virtual machine manager comprises policy settings that are configurable by an administrator, wherein the policy settings are measured as part of a measured launch of the virtual machine manager by the processor, wherein the policy setting are stored in a portion of the virtual machine manager, wherein the portion of the virtual machine manager is protected from direct memory access while the policy settings are measured to prevent corruption of the virtual machine manager; and wherein the policy settings comprise an instruction to disallow access by the at least one virtual machine to a port.

2. The system of claim 1, wherein the policy settings comprise an instruction to disallow access by the at least one virtual machine to hardware resource or device.

3. The system of claim 1, wherein the policy settings comprise an instruction to disallow booting of the virtual machine manager if a measurement of the policy settings shows that the policy settings have been modified or corrupted.

4. The system of claim 1, wherein the policy settings comprise an instruction to disallow booting of the virtual machine manager if a BIOS version has changed.

5. The system of claim 1, wherein the policy settings are built into an image of the virtual machine manager before installation of the virtual machine manager.

6. The system of claim 1, wherein the policy settings are configured by the administrator via a user interface.

7. The system of claim 6, wherein the policy settings are configured during installation of the virtual machine manager.

8. The system of claim 6, wherein the policy settings are configured while the virtual machine manager is offline.

9. A virtual machine manager method, the method comprising:
   inserting policy settings into a virtual machine manager, wherein the policy settings are provided by an administrator, and comprise an instruction to disallow access by at least one virtual machine to a port;
   measuring at least a portion of virtual machine manager, wherein the measured portion includes the policy settings, and wherein the measured portion of the virtual machine manager is protected from direct memory access while the policy settings are measured; and
   storing a result of the measurement.

10. The method of claim 9, wherein the measuring comprises creating a hash of the measured portion virtual machine manager, and the result is the hash.

11. The method of claim 9, wherein the policy settings are built into an image of the virtual machine manager before installation of the virtual machine manager.

12. The method of claim 9, wherein the inserting is accomplished via a user interface.

13. The method of claim 12, wherein the inserting is accomplished during installation of the virtual machine manager.

14. The method of claim 12, wherein the inserting is accomplished while the virtual machine manager is offline.

15. The method of claim 9, further comprising storing a result of the measurement in a trusted platform module (TPM).

16. The method of claim 9, wherein the policy settings comprise an instruction to disallow access by the at least one virtual machine to hardware resource or device.

17. A non-transitory computer readable storage medium comprising a program for measurement of a virtual machine manager, the program when executed by a computer processor causing the processor to:
   prepare a portion of a virtual machine manager to be measured, wherein the portion comprises policy settings configured by an administrator, and the policy setting comprise an instruction to disallow access by at least one virtual machine to a port;

measure the prepared portion, wherein the prepared portion of the virtual machine manager is protected from direct memory access while the prepared portion is measured; and store a result of the measurement.

18. The non-transitory computer readable storage medium of claim 17, wherein the measuring comprises creating a hash of the prepared portion of the virtual machine manager, and the result is the hash.

19. The non-transitory computer readable storage medium of claim 17, wherein the policy settings comprise an instruction to disallow access by the at least one virtual machine to hardware resource or device.

* * * * *